Figure 1:
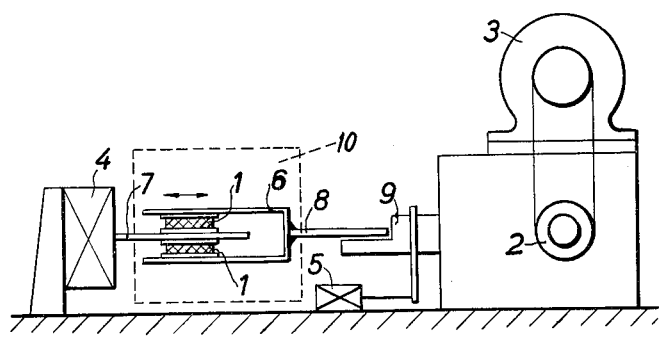

June 19, 1962 J. PETER ETAL 3,039,297
TEST FOR DETERMINING OPTIMUM VULCANIZATION
Filed March 19, 1958

INVENTORS:
JULIUS PETER, WILHELM HEIDEMANN, KONRAD ELLEGAST, RICHARD JUFFA.
BY
Connolly and Hutz
their ATTORNEYS

3,039,297
TEST FOR DETERMINING OPTIMUM VULCANIZATION

Julius Peter, Odenthal, Wilhelm Heidemann, Leverkusen, Konrad Ellegast, Leichlingen, and Richard Jüffa, Leverkusen, Germany, assignors to Farbenfabriken Bayer Aktiengesellschaft, Leverkusen, Germany, a corporation of Germany
Filed Mar. 19, 1958, Ser. No. 722,549
Claims priority, application Germany Mar. 26, 1957
5 Claims. (Cl. 73—88)

This invention relates to a novel process for determining optimal vulcanization.

It is known that rubber, rubber-like compounds and other high polymers can be converted by three-dimensional cross-linking of the molecules of the polymers ("vulcanization") into a highly elastic condition. The admixture of the cross-linking agents and also the subsequent moulding usually take place at comparatively low temperatures (generally not higher than 80–100° C.), but the three-dimensional cross-linking (vulcanization) on the other hand generally takes place at higher temperatures (120–160° C. and higher).

As a result of the vulcanization, the polymers then change gradually from the plastic to the elastic state, it being necessary to pass through the following stages:

(1) The heating of the mixture, which leads to a thermoplastic softening (softening or flow period).

(2) The initiation of the vulcanization (initial vulcanization).

(3) Continuous progress of the vulcanization until the stage of optimal vulcanization is reached. This optimum is maintained for a certain time (vulcanization plateau).

(4) The continued vulcanization with natural rubber results in a clear deterioration of the properties (reversion), and does not result in any substantial improvement in the properties with most types of synthetic rubber-like compounds.

This condition is referred to as "over-vulcanization."

The object of the technical vulcanizing process is to produce the most favourable properties. This means that the vulcanization should be stopped after reaching the optimum stage of vulcanization. It is accordingly of considerable technical interest to be able to establish accurately the period of time necessary for reaching the most favourable degree of vulcanization at a certain temperature.

It is also of interest to know when the flow period has ended and the initial vulcanization starts, since the moulding must be completed by the time the initial vulcanization commences, because the plastic mouldability is reduced by this initial vulcanization.

The methods in use at the present time for determining the most favourable vulcanization time are all carried out by first of all heating test slabs for different lengths of time to the vulcanization temperature (stage heating) and then subsequently determining the state of vulcanization in connection with these vulcanised test slabs by means of the know technological methods (tensile strength, elongation, modulus, hardness, elasticity, tear resistance, equilibrium swelling, etc.). This method requires the expenditure of a considerable amount of time and material, since it takes place in two stages (curing and testing).

It is an object of the present invention to provide a novel process for determining optimal vulcanization of polymers which can undergo cross-linking and thus to avoid over-vulcanization. A further object is to achieve this aim in a very simple manner. Other objects will appear hereinafter.

As we have found the complete course of the cross-linking of such polymers which can undergo cross-linking—this process is designated in the following as "vulcanization"—i.e. the flow period, start of the initial vulcanization, most favourable vulcanization and over-vulcanization, can be measured by continuous or periodic measurement of force and travel while subjected to static or dynamic tensile, compressive, shearing or torsional stressing.

Figure 2:
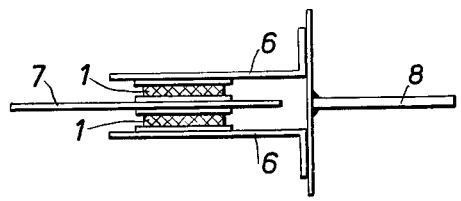
Figure 4:
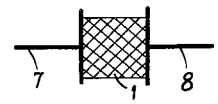
Figure 5:
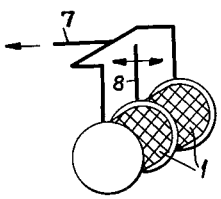

The process can for example be carried out in the manner indicated in FIGURES 1 and 2, in which the test elements 1 are clamped between the forked arms 6, which are preferably adjustable as regards their spacing, and a central plate 7 which is fixed at one of its ends to a dynamometer 4. The common end of the fork is fixed by means of a rod 8 to the reciprocating drive means 9, on which is situated the device 5 for measuring the travel. If only a static or dynamic tensile stressing shall be measured the test elements can be treated as indicated in FIG. 4. In this case the test elements 1 can be clamped between two plates as indicated in FIG. 4, the one plate being fixed by means of a rod to a dynamometer, and the other plate fixed by means of a rod to a reciprocating drive means. The reciprocating drive means 9 is driven by means of the driving unit 3 through the adjustable eccentric 2. If desired, the reciprocating drive means 9 can be so designed that torsional stresses are applied to the test elements, for example as is indicated in FIG. 5.

The vulcanization test element can be heated in any desired manner, for example electrically or with hot air or superheated steam and subjected in this form to the conditions arising in practice. Thus in FIGURE 1 there is indicated a heating zone 10 which surrounds test element 1. The process of the invention can be used for controlling the cross-linking of polymers of any kind which can undergo cross-linking. There may be mentioned natural rubber or synthetic rubber-like polymers which can be obtained for instance from conjugated diolefins such as butadiene, dimethylbutadiene, isoprene and their homologues or copolymers of conjugated diolefins with polymerizable vinyl compounds such as styrene, α-methyl-styrene and their substitution products, acrylonitrile, methacrylonitrile, acrylates and methacrylates and similar compounds or copolymers which are obtained from iso-olefins such as isobutylene and its homologues with a small amount of conjugated diolefins. Furthermore there are suitable polymerizates obtained from chlorobutadiene and its copolymerizates obtained with mono- and/or di-olefins or other polymerizable vinyl compounds. There can be used also the polymers of ethylene, propylene and furthermore polymers which can undergo cross-linking obtained from polyesters, polyethers or polysiloxanes.

The results obtained with the experimental arrangement of the instant invention conform to an excellent degree with those of other methods, as will be seen from the following examples.

Example 1

A natural rubber mixture of the following composition:

100.0 parts by weight of smoked sheets
5.0 parts by weight of zinc oxide
50.0 parts by weight of inactive carbon black
2.5 parts by weight of sulfur
1.0 part by weight of stearic acid
0.6 part by weight of cyclohexyl mercaptobenzthiazole sulfenamide
1.0 part by weight of phenyl-α-naphthylamine was subjected to a stage heating at 151° C. (4.0 atm.) separate samples being heated for different periods of time to the vulcanization temperature (151° C.) and the most favourable vulcanization time being established in connection with the heated specimens by determining the strength, elongation, modulus, hardness and elasticity. The following values were obtained:

| Vulcanization time, minutes | Tensile Strength kg./cm.² | Elongation, percent | Modulus (kg./cm.²) | | Hardness, ° Shore | Elasticity in percent | |
|---|---|---|---|---|---|---|---|
| | | | 300% | 500% | | 20° C. | 75° C. |
| 10 | 240 | 660 | 53 | 153 | 54 | 68 | 73 |
| 20 | 230 | 630 | 53 | 152 | 54 | 68 | 73 |
| 30 | 220 | 630 | 45 | 141 | 53 | 67 | 72 |
| 40 | 200 | 630 | 44 | 134 | 51 | 65 | 69 |
| 60 | 200 | 650 | 36 | 120 | 50 | 64 | 67 |
| 80 | 190 | 650 | 33 | 112 | 49 | 62 | 66 |
| 100 | 180 | 660 | 31 | 109 | 49 | 62 | 65 |

Figure 3:
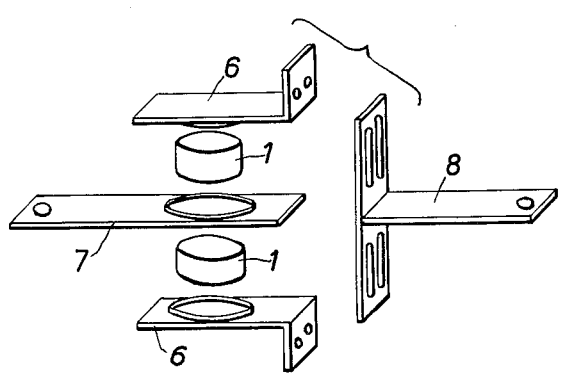

The testing by the method of the invention was carried out in the following manner:

Using the apparatus described in FIGS. 1-3, two test elements (20 x 20) were stamped out of the sheets (6 mm. thick) of the rubber mixtures referred to above, the said sheets being drawn out on a roller. The test elements were then subjected to a shearing stress with a frequency of 8⅓ c.p.s. and an amplitude of 0.25 mm. The testing temperature was 151° C. The following values were then obtained:

| Time in minutes | Damping, percent | Shearing modulus (kg./cm.²) |
|---|---|---|
| 0 | 11.2 | |
| 1 | 11.7 | |
| 2 | 14.5 | |
| 3 | 15.3 | 3.3 |
| 4 | 16.4 | 2.4 |
| 5 | 16.9 | 2.3 |
| 6 | 14.7 | 2.6 |
| 7 | 13.0 | 2.9 |
| 8 | 9.2 | 4.0 |
| 9 | 6.4 | 5.5 |
| 10 | 5.5 | 5.9 |
| 12 | 4.7 | 6.6 |
| 14 | 4.5 | 7.4 |
| 16 | 4.3 | 7.3 |
| 18 | 4.1 | 7.1 |
| 20 | 4.1 | 6.8 |
| 25 | 4.2 | 6.5 |
| 30 | 4.3 | 5.8 |
| 35 | 4.4 | 5.3 |
| 40 | 4.7 | 4.9 |
| 45 | 5.0 | 4.6 |
| 50 | 5.2 | 4.3 |
| 55 | 5.5 | 4.0 |
| 60 | 5.8 | 3.7 |
| 65 | 6.1 | 3.5 |

In both cases, the most favourable vulcanization time is found to be 10-20 minutes at 151° C.

*Example 2*

A mixture of a butadiene-styrene copolymer of the following composition:

100.0 parts by weight of butadiene-stryene copolymer
5.0 parts by weight of zinc oxide
50.0 parts by weight of inactive carbon black
1.8 parts by weight of sulfur
1.0 part by weight of stearic acid
0.5 part by weight of paraffin
1.3 parts by weight of N-cyclohexyl benzethiazyl sulfenamide
1.0 part by weight of phenyl-α-naphthylamine was subjected to stage heating at 151° C. (=4.0 atm.), separate specimens being heated for different periods of time to the vulcanization temperature (151° C.) and the most favourable vulcanization period established in connection with the heated specimens by determining the strength value, elongation, modulus, hardness and elasticity. The following values were obtained:

| Vulcanization time, minutes | Strength, kg./cm.² | Elongation, percent | Modulus (kg./cm.²) | | Hardness, ° Shore | Elasticity in percent | |
|---|---|---|---|---|---|---|---|
| | | | 300% | 500% | | 20° C. | 75° C. |
| 10 | 3 | 950 | 3 | 3 | 31 | 53 | 42 |
| 20 | 75 | 630 | 18 | 45 | 49 | 52 | 52 |
| 30 | 100 | 540 | 36 | 90 | 54 | 51 | 59 |
| 40 | 100 | 470 | 40 | | 55 | 50 | 60 |
| 60 | 110 | 515 | 43 | 110 | 55 | 50 | 60 |
| 80 | 110 | 490 | 42 | | 55 | 49 | 60 |
| 100 | 120 | 450 | 43 | 110 | 55 | 49 | 60 |

By carrying out the test in accordance with the process of the invention and in the manner described in Example 1, the following values were obtained:

| Time in minutes | Damping, percent | Shearing modulus (kg./cm.²) |
|---|---|---|
| 0 | 10.8 | 14.0 |
| 1 | 14.8 | 4.9 |
| 2 | 15.8 | 3.1 |
| 3 | 16.4 | 2.7 |
| 4 | 16.6 | 2.5 |
| 5 | 16.5 | 2.4 |
| 6 | 16.1 | 2.4 |
| 7 | 15.9 | 2.4 |
| 8 | 15.8 | 2.4 |
| 9 | 15.7 | 2.5 |
| 10 | 15.5 | 2.5 |
| 12 | 15.0 | 2.7 |
| 14 | 13.3 | 3.0 |
| 16 | 11.5 | 3.4 |
| 18 | 9.4 | 4.3 |
| 20 | 7.0 | 6.5 |
| 25 | 4.1 | 7.5 |
| 30 | 3.6 | 8.4 |
| 35 | 3.5 | 8.5 |
| 40 | 3.2 | 8.6 |
| 45 | 3.1 | 8.7 |
| 50 | 3.0 | 8.7 |
| 55 | 2.9 | 8.6 |
| 60 | 2.8 | 8.6 |
| 65 | 2.8 | 8.6 |

In both cases, the most favourable vulcanization time is found to be 30-40 minutes at 151° C.

Equivalent results are obtained if the tests are carried out by means of a static or dynamic tensile stressing or a torsional stressing as indicated in FIGS. 4 and 5.

*Example 3*

A mixture of an isobutylene-isoprene copolymer (butyl-rubber) of the following composition:

100.0 parts by weight of isobutylene-isoprene copolymer
5.0 parts by weight of zinc oxide
1.8 parts by weight of sulphur
1.0 part by weight of stearic acid
0.5 part by weight of paraffin
1.3 parts by weight of tetramethyl thiuramidsulphide
0.6 part by weight of mercaptobenzthiazole
1.0 part by weight of phenyl-α-naphthylamine 50.0 parts by weight of inactive carbon black was subjected in one case to a stage heating at 151° C. (=4.0 atm.), separate specimens being heated for different periods of time to the vulcanisation temperature (151° C.) and the most favourable vulcanisation time established in connection with the heated specimens by determining the strength value, elongation, modulus, hardness and elasticity. The following values were obtained

| Vulcanisation time, minutes | Strength kg./cm.² | Elongation, percent | Modulus (kg./cm.²) | | Hardness, ° Shore | Elasticity in percent | |
|---|---|---|---|---|---|---|---|
| | | | 300% | 500% | | 20° C. | 75° C. |
| 10 | 120 | 950 | 9 | 22 | 42 | 11 | 37 |
| 20 | 120 | 810 | 18 | 32 | 49 | 12 | 37 |
| 30 | 110 | 710 | 21 | 41 | 51 | 12 | 37 |
| 40 | 110 | 700 | 26 | 45 | 51 | 12 | 37 |
| 60 | 90 | 610 | 28 | 53 | 52 | 12 | 38 |
| 80 | 80 | 550 | 30 | 60 | 52 | 12 | 44 |
| 100 | 70 | 530 | 32 | 60 | 53 | 12 | 49 |

As a result of the test carried out according to the process of the invention and in the manner described in Example 1, the following values were obtained:

| Time in minutes | Damping, percent | Shearing modulus (kg./cm.²) |
|---|---|---|
| 0 | 8.5 | 7.3 |
| 1 | 11.5 | 4.4 |
| 2 | 13.0 | 3.3 |
| 3 | 13.5 | 2.7 |
| 4 | 12.9 | 2.3 |
| 5 | 12.0 | 2.5 |
| 6 | 10.6 | 2.9 |
| 7 | 8.8 | 3.2 |
| 8 | 7.1 | 3.8 |
| 9 | 6.3 | 4.0 |
| 10 | 6.1 | 4.2 |
| 12 | 6.0 | 4.5 |
| 14 | 5.9 | 4.7 |
| 16 | 5.7 | 5.0 |
| 18 | 5.7 | 5.2 |
| 20 | 5.6 | 5.3 |
| 25 | 5.6 | 5.5 |
| 30 | 5.4 | 5.7 |
| 35 | 5.3 | 5.7 |
| 40 | 5.5 | 5.8 |
| 45 | 5.8 | 5.8 |
| 50 | 5.9 | 5.7 |
| 55 | 5.9 | 5.7 |
| 60 | 5.8 | 5.7 |
| 65 | 5.9 | 5.7 |

In both cases, the most favourable vulcanisation time is found to be 30–40 minutes at 151° C.

Using the process according to the invention, it is also possible to establish vulcanisation and initial vulcanisation velocities at different temperatures.

When it is important that the plastic behaviour should be studied in a particularly satisfactory manner, it is advantageous to use substantially lower frequencies.

We claim:

1. In a system for determining the degree of vulcanization of a vulcanizable elastomer, in combination, a dynamometer, a reciprocating drive means terminating at one end in a fork, a source of power for said reciprocating drive means, means for securing test slabs of a vulcanizable mixture to the fork of said drive means, a pressure responsive element attached to said dynamometer and extending through said test slabs, whereby the reciprocating movement of the fork causes the test slabs to slide over said pressure responsive element and to thereby transmit a measurable force to the dynamometer, and means for heating said test slabs to effect gradual vulcanization thereof, the degree of vulcanization determining the force transmitted to the dynamometer whereby the degree of vulcanization can be accurately measured as it progresses toward completion.

2. A method of continuously measuring the degree of vulcanization of a single sample of a vulcanizable elastomer which comprises heating a sample of the vulcanizable mixture while it is positioned between a dynamometer and a reciprocating drive means and measuring the forces at the dynamometer which are produced solely by the advance of the reciprocating drive means through the vulcanization mixture, the stroke of the reciprocating drive means being constant.

3. A method of continuously measuring the degree of vulcanization of a single sample of vulcanizable elastomer which comprises heating a sample of the vulcanizable mixture while it is positioned between a dynamometer and a reciprocating drive means and measuring the linear advance of an element whose movement depends on the constant power of the reciprocating drive means.

4. A method of continuously measuring the degree of vulcanization of a single sample of a vulcanizable elastomer which comprises positioning said sample of vulcanizable elastomer between a dynamometer and a reciprocating drive means which oscillates at a constant amplitude, heating the sample while so positioned, subjecting the heated sample to deformation by means of the reciprocating action of said drive means, and measuring the forces which cause said deformation of the sample.

5. An apparatus for continuously measuring the degree of vulcanization of a single sample of vulcanizable elastomer which comprises, in combination, a dynamometer, a reciprocating drive means, a source of power adapted to impel said reciprocating drive means at a constant rate, means for positioning a sample of vulcanizable material between the dynamometer and the reciprocating drive means in such a way as to establish a force-transmitting connection between them, so that the force of each stroke of the riciprocating drive means is transmitted through said sample to the dynamometer, means for heating said sample to effect vulcanization thereof, the length of the stroke of the reciprocating drive means being a function of the degree of vulcanization of the sample, and means for measuring the length of each stroke and thus indicating the degree of vulcanization of the sample.

References Cited in the file of this patent

UNITED STATES PATENTS

| 1,327,838 | Naylor | Jan. 13, 1920 |
| 2,557,641 | Dudley | June 19, 1951 |
| 2,732,708 | Linhorst | Jan. 31, 1956 |
| 2,733,596 | Painter | Feb. 7, 1956 |

OTHER REFERENCES

LeBras, "Rubber," (1957), Chem. Publ. Co., N.Y., pages 166–168 and pages 349–351. (Copy in Sci. Lib.)

UNITED STATES PATENT OFFICE
CERTIFICATE OF CORRECTION

Patent No. 3,039,297            June 19, 1962

Julius Peter et al.

It is certified that error appears in the above identified patent and that said Letters Patent are hereby corrected as shown below:

Column 5, between lines 33 and 34, insert the following paragraph:

While the invention has been illustrated in the Examples as applied to three specific rubbery polymers, it should be understood that it is applicable to such other vulcanizable elastomers as diisocyanate-modified polyesters, silicone rubber, polychloroprene, acrylonitrile-butadiene copolymers, and chlorosulfonated polyethylenes.

Signed and sealed this 16th day of December 1969.

(SEAL)
Attest:

EDWARD M. FLETCHER, JR.          WILLIAM E. SCHUYLER, JR.
Attesting Officer                  Commissioner of Patents